(12) United States Patent
Grinberg et al.

(10) Patent No.: US 12,468,134 B2
(45) Date of Patent: Nov. 11, 2025

(54) PATTERN PROJECTING APPARATUS FOR USE IN A THREE-DIMENSIONAL IMAGING ARRANGEMENT

(71) Applicant: Inuitive Ltd., Raanana (IL)

(72) Inventors: Pavel Grinberg, Netanya (IL); Alan Geller, Kfar Yona (IL); Mishel Ivgi, Yehud-Monoson (IL)

(73) Assignee: INUITIVE LTD., Ra'anana (IL)

( * ) Notice: Subject to any disclaimer, the term of this patent is extended or adjusted under 35 U.S.C. 154(b) by 988 days.

(21) Appl. No.: 17/498,997

(22) Filed: Oct. 12, 2021

(65) Prior Publication Data

US 2023/0112460 A1    Apr. 13, 2023

(51) Int. Cl.
*G02B 19/00* (2006.01)
*G02B 5/00* (2006.01)
*G03B 21/14* (2006.01)
*G03B 21/20* (2006.01)

(52) U.S. Cl.
CPC ......... *G02B 19/0047* (2013.01); *G02B 5/005* (2013.01); *G03B 21/14* (2013.01); *G03B 21/2053* (2013.01)

(58) Field of Classification Search
CPC .... G02B 19/0047; G02B 5/005; G02B 13/16; G03B 21/14; G03B 21/2053
USPC .......................................................... 353/97
See application file for complete search history.

(56) References Cited

U.S. PATENT DOCUMENTS

| | | | |
|---|---|---|---|
| 2019/0155128 A1* | 5/2019 | Shimizu | G02B 7/10 |
| 2020/0322589 A1* | 10/2020 | Zhang | H04N 23/55 |
| 2021/0389654 A1* | 12/2021 | Lee | G02B 13/16 |

* cited by examiner

*Primary Examiner* — Magda Cruz
(74) *Attorney, Agent, or Firm* — FisherBroyles, LLP; Roger L. Browdy; Ronni S. Jillions

(57) ABSTRACT

A pattern projector is disclosed. The pattern projector comprises a light source, a projection lens, a mask and configured to enable the at least one projection lens to illuminate a target while projecting the pre-defined pattern thereat, and at least one holder, and wherein the pattern projector is characterized in that the at least one light source is a wide area light source, and wherein the area of the at least one mask or the at least one mask active area, is smaller than the area of the at least one light source, enabling to refrain from applying condenser optics or focusing optics between the at least one light source and the at least one mask.

8 Claims, 3 Drawing Sheets

PATTERN PROJECTING APPARATUS FOR USE IN A THREE-DIMENSIONAL IMAGING ARRANGEMENT

TECHNICAL FIELD

The present disclosure generally relates to the field of three-dimensional imaging, and more particularly, to an illumination device for implementing structured light and/or applying active stereo methods.

BACKGROUND

A stereoscopic camera arrangement is an element made of two camera units, assembled in a stereoscopic module. Stereoscopy (also referred to as "stereoscopics") is a technique for determining the depth in an image by means of stereopsis. In other words, it is the impression of depth that is perceived when a scene is viewed with both eyes by someone with normal binocular vision which is responsible for creating two slightly different images of the scene in the two eyes due to the eyes'/camera's different locations.

Active stereo vision is a form of stereo vision which actively employs a light emitting device such as a laser diode or a device configured to emit structured light (e.g., patterned light) in order to simplify the stereo matching problem.

Cameras may be used as means to measure depth in a captured three-dimensional image by projecting a pattern onto the object or scene which depth is to be measured, and then calculating the shift occurred in the pattern retrieved by using triangulation methods.

In the field of active stereo, a pattern is projected onto an object or a scene to be measured, and two cameras located at a sufficient distance apart, are used to capture an image of the scene. In this case, depth information can be extracted by examining the relative shifts of different parts of the pattern within the image captured by each of the two cameras.

In the field of structured light, a known pattern is projected onto a scene whose image should be processed. A single camera, located at a sufficient distance from the projector, may be used to measure the relative shift of the pattern along the plane of the baseline (usually the horizontal plane) between the emitted light and the captured image. Depth information can then be extracted by examining relative shifts in different areas of the captured scene when compared to the known pattern.

In both structured light and active stereo, it is important that the pattern be pseudo-random, and is not repeated along the plane of the baseline (usually the horizontal plane).

Pattern projectors for 3-dimensional imaging devices typically comprise a light source, means to collect the light, and an object which is used to form the pattern that will be processed. One type of pattern projector is a mask projector. Such a projector comprises a mask etched into it, having a pattern that will be projected. A projecting lens is then used to project the illuminated pattern onto the scene whose image is to be captured. In a mask projector, a light source such as a laser diode or LED, is concentrated onto a mask via a condenser optic. A condenser is an optical lens which renders a divergent beam from a source into a parallel or converging beam to illuminate an object such as the mask.

As known in the art, condensers typically are an essential part of any projection device. An imaging lens can be used as the projecting lens. However, as known in the art, the chief ray angle (CPA) of the projecting lens must be matched by the condenser optic.

The present invention proposes a novel solution whereby depth measurements for 3-dimensional imaging using a mask projector can be achieve while eliminating the use of a condenser lens.

SUMMARY OF THE DISCLOSURE

The disclosure may be summarized by referring to the appended claims.

It is an object of the present disclosure to provide a novel pattern projector that does not require applying a condenser optic or a focusing optic between its light source and the pattern generating mask.

Other objects of the present invention will become apparent from the following description.

According to a first embodiment of the disclosure, there is provided a pattern projecting apparatus comprising at least one light source, at least one projection lens, at least one mask configured to enable the at least one projection lens to illuminate a target while projecting a pattern thereat, and wherein the pattern projecting apparatus is characterized in that the at least one light source is a wide area light source, wherein the area of the at least one mask or the at least one mask active area, is smaller than the area of the at least one light source, enabling to refrain from applying condenser optics or focusing optics between the at least one light source and the at least one mask.

In accordance with another embodiment, the pattern projecting apparatus is further characterized in that a chief ray angle (CRA) of the projection lens is matched with an edge of the active area of the at least one mask.

According to another embodiment of the present invention the light source is a large area LED having a diffuse angular distribution.

By yet another embodiment the pattern projecting apparatus is further characterized in that a small gap extends between the at least one light source and the least one mask.

In accordance with still another embodiment, the pattern projecting apparatus is further characterized in that the at least one light source is in contact with the at least one mask.

According to another embodiment, the at least one mask is a spatial light modulator or any other applicable similar active transparent array, configured to illuminate a varying pattern at the target.

In accordance with still another embodiment, the pattern projection apparatus is further characterized in that the at least one mask is tilted relatively to the at least one projection lens, thereby providing an improved focus of a tilted projector across the target area per requirements that are set in compliance with the Scheimpflug principal. The term "Scheimpflug principle" as used herein, is used to denote the description of the geometric relationship between the orientation of the plane of focus, the lens plane, and the image plane of an optical system (such as a camera), when the lens plane is not parallel to the image plane.

By still another embodiment, the pattern projection apparatus is further characterized in that the at least one mask is latterly offset from the optic axis of the at least one projection lens, and wherein the pattern projection apparatus is further tilted to improve uniformity of the illumination obtained while applying a tilted pattern projection apparatus, relatively to illumination obtained while applying a non-tilted pattern projection apparatus.

BRIEF DESCRIPTION OF THE DRAWINGS

For a more complete understanding of the present invention, reference is now made to the following detailed description taken in conjunction with the accompanying drawing sheets, wherein.

DETAILED DESCRIPTION

Figure 1:
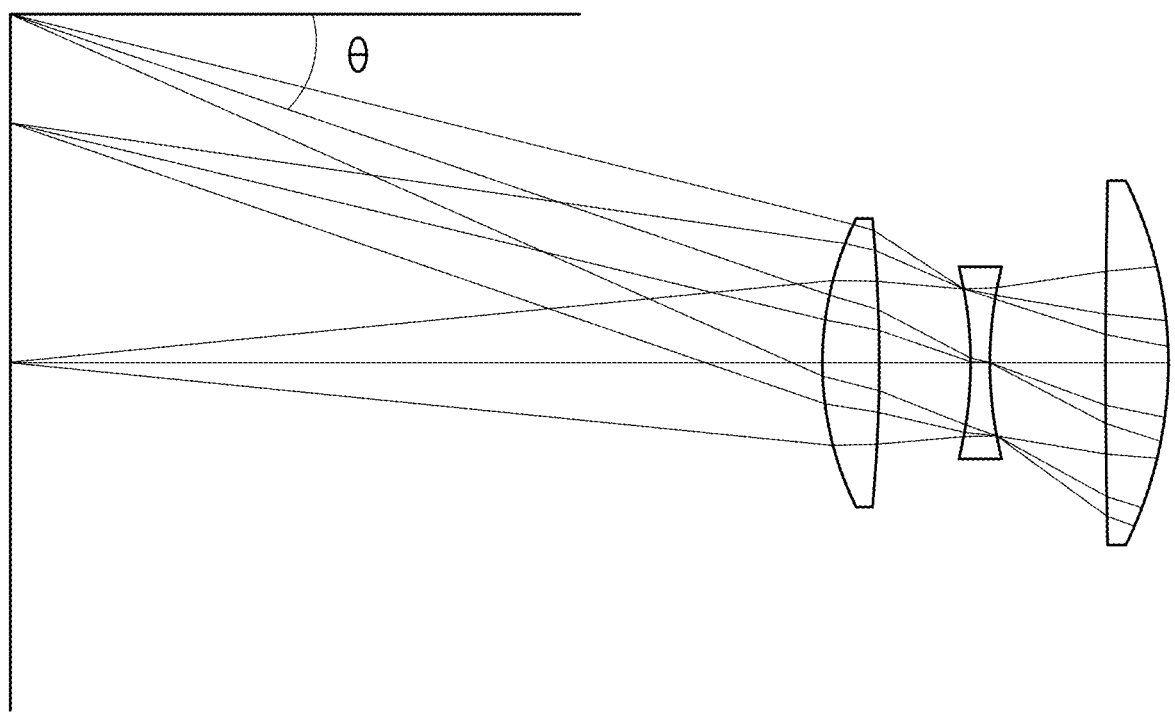
FIG. 1—depicts an example of an arrangement construed in accordance with an embodiment of the present disclosure in which a gap extends between the light emitting source and the mask.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

The accompanying drawings, which are incorporated herein and form a part of the specification, illustrate the present invention and, together with the description, further serve to explain the principles of the present invention and to enable a person skilled in the pertinent art to practice the invention.

Known patterns are often projected by structured-light sensors or active stereo sensors onto a scene. The deformation of these known patterns as it appears to the sensor camera when the pattern strikes surfaces, allows vision systems to calculate depth and surface information of the objects present in the scene, as used for example in structured light 3D scanners.

A pattern projector may comprise a light source, one or more optical components, and a package (housing). The purpose of this device is to project a light pattern. This typically may be achieved by manipulating light emitted from a source or an array of sources, and shaping it into the desired pattern at the desired intensity. In numerous projector modules, a laser or array of lasers are utilized, optionally a lens and a pattern-shaping element, a micro-structured optical element, such as a diffuser or DOE.

The present invention relates to a solution whereby the need to implement the condenser lens (or focusing optics) in a mask projector for 3-dimensional imaging, is eliminated. By matching the chief ray angle (CRA) of the projection lens to the mask illumination, the need to use such a condenser optic is eliminated.

By the proposed solution, the pattern projector uses a large area LED or any other applicable light source configured to emit diffuse (wide angle) illumination, that is associated with a mask whose size or active area is smaller than the LED illuminator area. The present invention does not use any condenser or focusing optic implemented between the light source and the mask, and the projection lens may then be used to focus the light emitted via the pattern mask onto the target (scene) whose image is to be captured by an image capturing device (e.g., a camera sensor).

The present disclosure is directed to a projection system which is configured to project a pattern for use in three-dimensional imaging. The exemplified embodiments relate to a projection system that is provided with an LED light source, however, as will be appreciated by those skilled in the art, any other applicable light source may be used.

Figure 4:
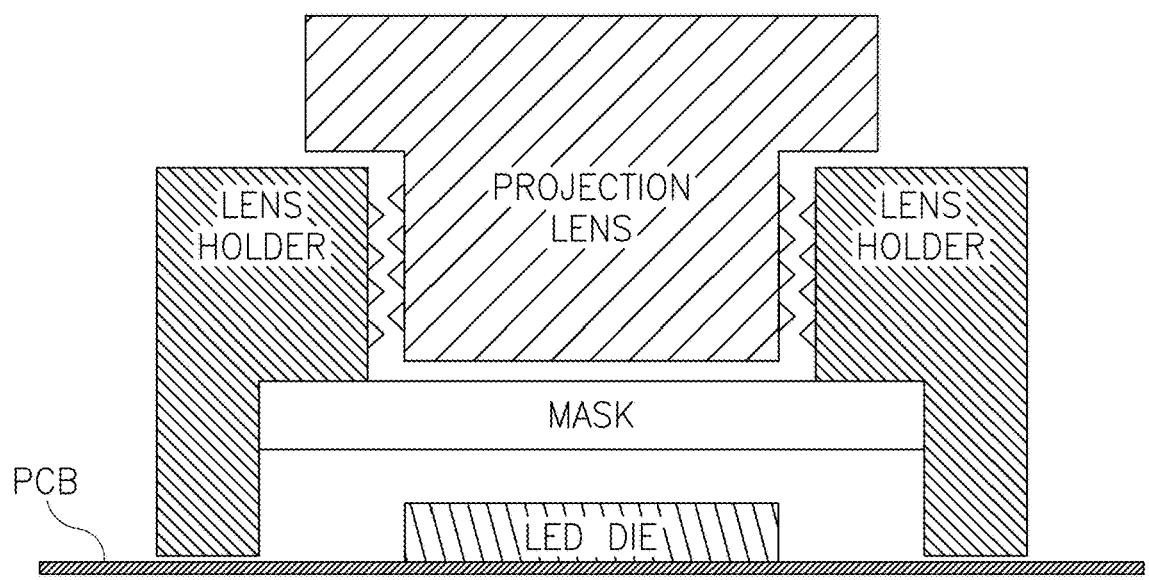
FIG. 4—illustrates an example of a structured light three-dimensional image capturing arrangement.
Figure 5:
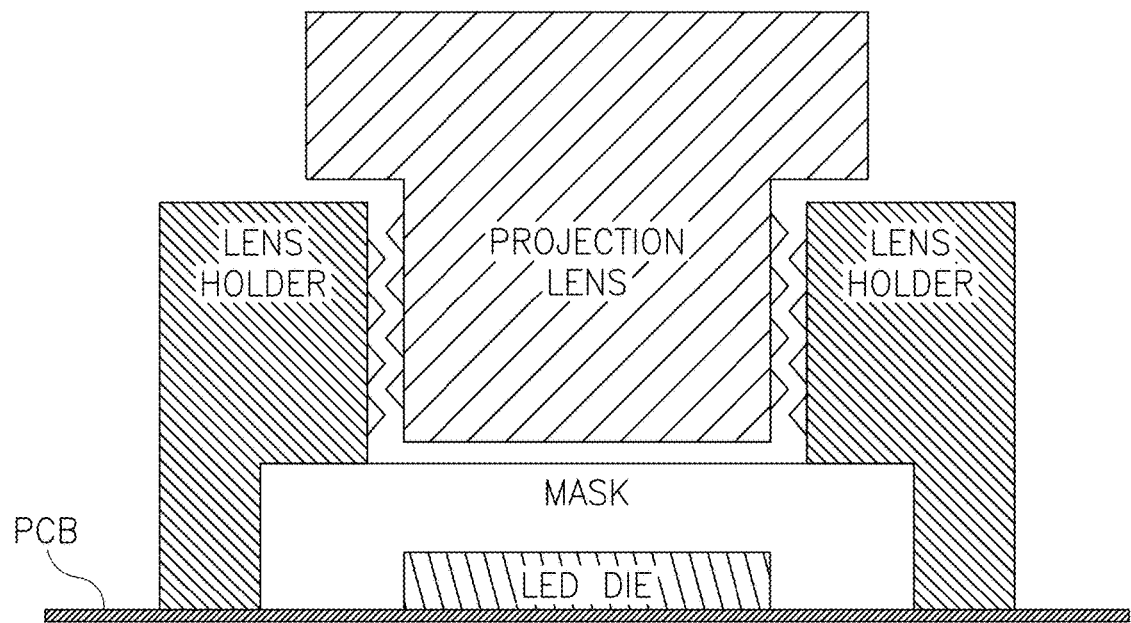
FIG. 5—exemplifies an active stereo three-dimensional image capturing arrangement.

FIG. 1 exemplifies such a pattern projection system (1) that comprises a LED light source (3), a PCB board (5), an etched mask (7), a projection lens (9), and a holder (11). Such a system may be implemented in a variety of three-dimensional systems, including, but not limited to: a structured light system (as illustrated in FIG. 4), and an active stereo system (as illustrated in FIG. 5).

As may be seen in the example presented in FIG. 1, the light source of the pattern projector is not in contact with mask. Consequently, it is possible to leave a small gap extending between the light source and the mask, a gap which may be utilized for example to locate wire-bond leads connected to the light source (LED), and/or to allow cooling of the light source itself.

Figure 2:
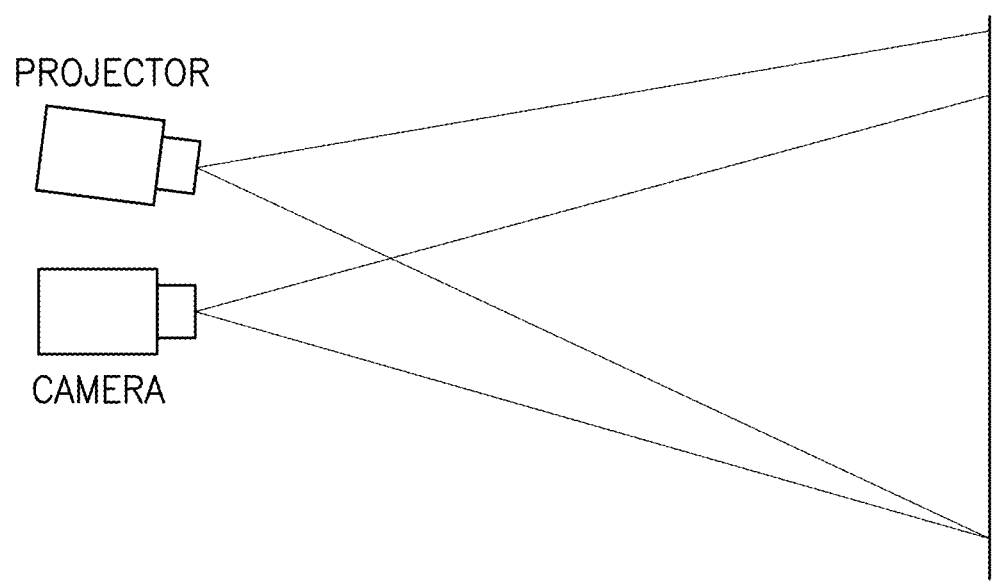
FIG. 2—depicts an example of an arrangement construed in accordance with an embodiment of the present disclosure in which there is no gap that extends between the light emitting source and the mask.

FIG. 2 demonstrates a somewhat different pattern projecting system, in which the light source is in contact with the mask. In this example, the mask is mounted directly onto the LED light source (or any other applicable light source), and wherein the active area of the mask facing either the LED light source, or the projection lens. The projection lens in turn is configured to project the active area of the mask.

Figure 3:
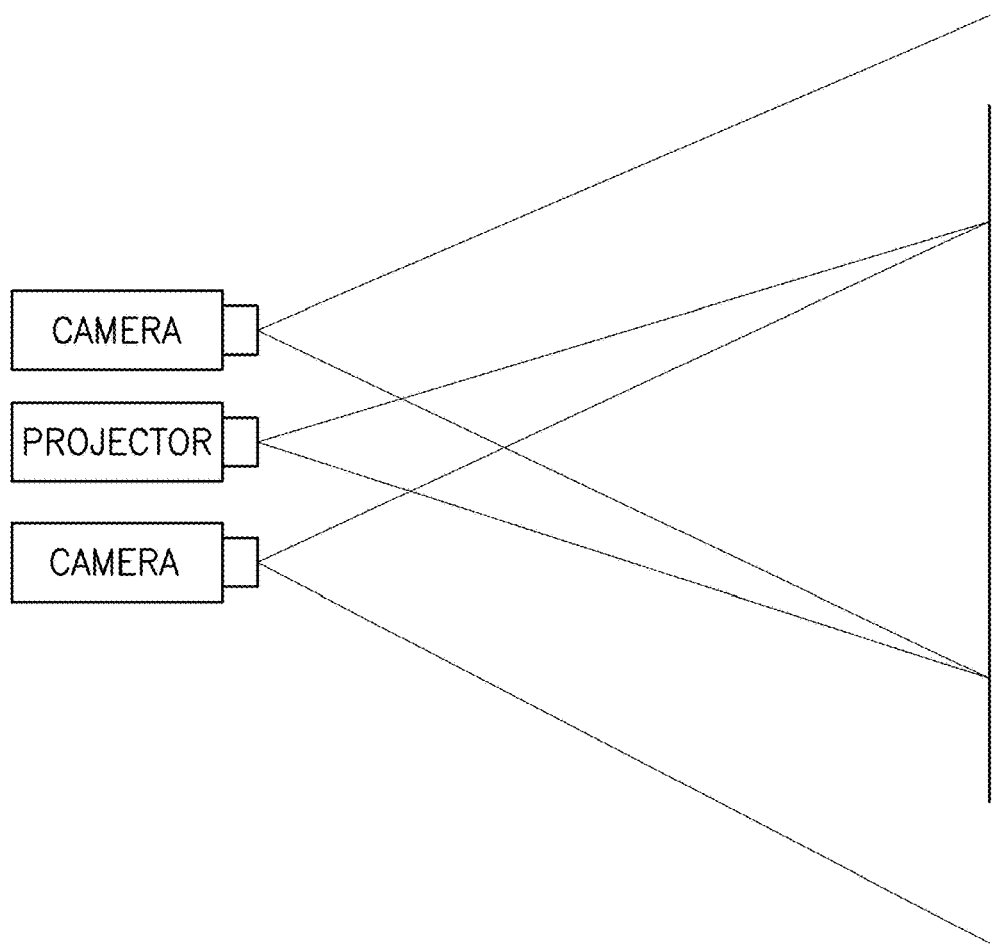
FIG. 3—illustrates an example of a chief ray angle of a lens used for projecting a pattern onto a scene.

Pattern projectors usually use a condenser optic in order to illuminate the mask and match the chief ray angle of the projection lens. However, according to the solution provided by the present invention, a wide area light source such as a large area LED having a diffuse (wide angle) angular distribution, is used. The large area of the light source is in contact with, and fully illuminates the active area of the mask, while the diffuse angular distribution matches the chief ray angle of the projection lens, in order to enable the emitted light to fill the cone angle as depicted in FIG. 3.

In a case where the pattern projecting system is provided with having an active pattern, it is possible to replace the static mask with a variable element such as a special light modulator (SLM). In this embodiment, it is possible to change the projected pattern, for example, to obtain a structured light three-dimensional reconstruction.

According to another embodiment of the present invention, the pattern projector as depicted FIG. 1, may be manufactured and aligned by following a method the comprises the steps of:

(i) providing a barrel holder, configured to hold both the mask and LED light source at the bottom part thereof, and to mount (e.g., screw) the projection lens at the top part;

(ii) placing and securing the mask. The mask can be placed facing the lens, or placed facing away from lens, towards LED light source;

(iii) placing and securing the LED light source onto the PCB. The LED light source may be located adjacent to, or spaced away from the mask;

(iv) tightening and focusing the projection lens so as to ensure that the projected mask pattern is focused onto a selected object; and (v) securing the position of the focused projection lens as determined in step (iv), by using a dab of glue.

Figure 6:
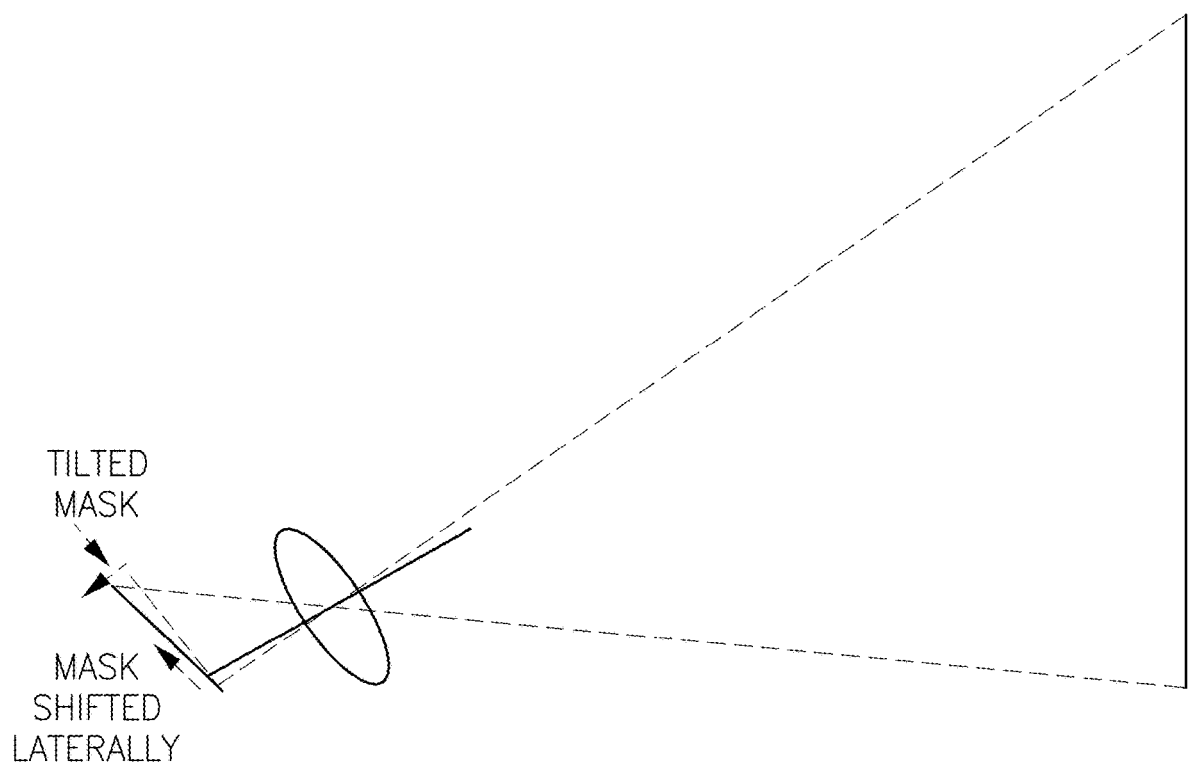
FIG. 6—illustrates implementation of the Scheimpflug principal, to ensure consistent focus across the target, as well as a mask offset with respect to the projection lens, to enable attaining a more uniform illumination at the target.

FIG. 6 illustrates another embodiment construed in accordance with another embodiment of the present invention, which is aimed to modify the projector in order to optimize the illumination of a target at a certain angle. This embodiment is illustrated in FIG. 6, and may include one or both of the following two optional modifications. The first being tilting the mask away from the lens in order to fulfil the requirements as set by the Scheimpflug principle. Implementing this modification keeps the projection of the entire mask focused on the target despite the tilt of the projector. The second optional modification comprises moving the mask laterally and upwardly, in the direction of the tilt, and then tilt the projector further than it was previously tilted. This modification enables achieving a more uniform distribution of light by compensating for the uneven falloff (relative illumination) due to tilt. Both principals are demonstrated in FIG. 6.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Having illustrated the present invention, it should be understood that various adjustments and versions might be implemented without departing from the scope of the present invention.

The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A pattern projecting apparatus comprising at least one light source, at least one projection lens, at least one mask and configured to enable the at least one projection lens to project a pattern, and
   wherein said pattern projecting apparatus is characterized in that the at least one light source is a wide area light source, and
   wherein the area of the at least one mask or the at least one mask active area, is smaller than the area of the at least one light source,
   thereby enabling to refrain from applying condenser optics or focusing optics between the at least one light source and the at least one mask.

2. The pattern projecting apparatus of claim 1, further characterized in that a chief ray angle (CRA) of the projection lens is matched with an edge of the active area of the at least one mask.

3. The pattern projecting apparatus of claim 1, wherein said a light source is a large area LED having a diffuse angular distribution.

4. The pattern projecting apparatus of claim 1, further characterized in that that a small gap extends between the at least one light source and the at least one mask.

5. The pattern projecting apparatus of claim 1, further characterized in that the at least one light source is in direct contact with the at least one mask.

6. The pattern projection apparatus of claim 1, wherein the at least one mask is a spatial light modulator or a similar active transparent array, configured to project a varying pattern.

7. The pattern projection apparatus of claim 1, further characterized in that said at least one mask is tilted relatively to the at least one projection lens thereby enabling provisioning of an improved focus of a tilted projector across a target area per requirements of Scheimpflug principle.

8. The pattern projection apparatus of claim 1, further characterized in that the at least one mask is latterly offset from the optic axis of the at least one projection lens, and wherein said pattern projection apparatus is further tilted to improve uniformity of the illumination obtained while applying a tilted pattern projection apparatus, relatively to illumination obtained while applying a non-tilted pattern projection apparatus.

* * * * *